US012594542B2

(12) United States Patent
He et al.

(10) Patent No.: US 12,594,542 B2
(45) Date of Patent: Apr. 7, 2026

(54) HOLLOW SPHERICAL CATALYST FOR FIXED BED WITH INTERNAL FLUIDIZATION OF PARTICLES, AND METHOD FOR PREPARING SAME

(71) Applicant: Beijing University of Chemical Technology, Beijing (CN)

(72) Inventors: Yufei He, Beijing (CN); Xingye Lin, Beijing (CN); Dianqing Li, Beijing (CN); Shuai Chen, Beijing (CN); Yanan Liu, Beijing (CN); Junting Feng, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 475 days.

(21) Appl. No.: 18/316,455

(22) Filed: May 12, 2023

(65) Prior Publication Data

US 2023/0390753 A1 Dec. 7, 2023

(30) Foreign Application Priority Data

Jun. 1, 2022 (CN) .......................... 202210615363.0

(51) Int. Cl.
| | |
|---|---|
| *B01J 35/08* | (2006.01) |
| *B01J 21/04* | (2006.01) |
| *B01J 23/42* | (2006.01) |
| *B01J 23/44* | (2006.01) |
| *B01J 35/37* | (2024.01) |
| *B01J 35/40* | (2024.01) |
| *B01J 35/52* | (2024.01) |
| *B01J 37/02* | (2006.01) |
| *B01J 37/08* | (2006.01) |

(52) U.S. Cl.
CPC .............. *B01J 21/04* (2013.01); *B01J 23/42* (2013.01); *B01J 23/44* (2013.01); *B01J 35/37* (2024.01); *B01J 35/40* (2024.01); *B01J 35/52* (2024.01); *B01J 37/0211* (2013.01); *B01J 37/08* (2013.01)

(58) Field of Classification Search
CPC ... B01J 35/52; B01J 35/37; B01J 35/40; B01J 21/04; B01J 23/42; B01J 23/44; B01J 37/0211; B01J 37/08
See application file for complete search history.

(56) References Cited

U.S. PATENT DOCUMENTS

2002/0045543 A1 4/2002 Takatori et al.

FOREIGN PATENT DOCUMENTS

| | | | | |
|---|---|---|---|---|
| CN | 104163444 A | 11/2014 | | |
| CN | 105688766 A | 6/2016 | | |
| CN | 105903468 A | 8/2016 | | |
| CN | 107233881 A | 10/2017 | | |
| CN | 109261148 A | * 1/2019 | ........ | B01D 53/8662 |
| CN | 112808189 A | 5/2021 | | |
| CN | 113600157 A | 11/2021 | | |

* cited by examiner

*Primary Examiner* — Yong L Chu

(57) ABSTRACT

A hollow spherical catalyst for a fixed bed with internal fluidization of particles and a method for preparing the same. The preparation method includes: fully mixing precious metal nanopowder with an organic oil phase to form an internal oil phase; preparing a gel ball of an oil-in-water structure by taking an aluminum oxide molding solution as an outer aqueous phase using an independently researched and developed coaxial dual-dropper forming apparatus; and then preparing a hollow aluminum oxide catalyst containing precious metal powder from the gel ball through processes of aging, calcination, and reduction. The resulting catalyst is expressed as $X@Al_2O_3$, where the precious metal nanopowder X is wrapped inside hollow $Al_2O_3$, and the catalyst has an outer diameter of 1.5-5.0 mm, a shell pore diameter (aluminum oxide) of 10-50 nm, and the precious metal nanopowder sized 200-500 nm.

5 Claims, 5 Drawing Sheets

HOLLOW SPHERICAL CATALYST FOR FIXED BED WITH INTERNAL FLUIDIZATION OF PARTICLES, AND METHOD FOR PREPARING SAME

TECHNICAL FIELD

The present invention relates to the field of catalytic materials, and in particular to, a hollow spherical catalyst for a fixed bed and a method for preparing the same.

BACKGROUND ART

During a catalytic reaction, problems, such as material mixing, mass transfer, and heat transfer, are important factors that affect catalytic efficiency. In industry, it is necessary to comprehensively consider the problems existing in reaction processes to select appropriate reactors, where fixed-bed reactors and fluidized-bed reactors are commonly used. The fixed-bed reactors are characterized by immobile catalyst filled in the device, simple structure, small mechanical wear of catalyst particles, and convenient operations, but suffer from difficulty in fully mixing materials and relatively poor mass transfer and heat transfer. In a fluidized bed, catalyst particles are held up by fluid for suspension movement. Compared with a fixed bed, the fluidized bed can increase contact areas between heterogeneous components and achieve high catalytic efficiency. However, due to violent turbulence of particles and severe collisions between particles, catalyst crushing is caused, and active components are easily lost and are difficult to recycle. In view of the problems existing in the above two reactors, it is very necessary to develop a novel internally fluidizable catalyst particle to fill in a fixed-bed reactor, so as to realize the complementary advantages of the two, to improve the catalytic efficiency, and to reduce catalyst particle losses.

The above problems can be solved by filling fluidable precious metal nanopowder in a hollow spherical carrier which has favorable pore channels to ensure free entry and exit of reactants and product molecules. An aluminum oxide carrier has many advantages, such as porous structure, large specific surface area, and high stability, and is widely used in the field of industrial catalysis. Moreover, aluminum oxide can be internally compact, porous, or hollow. Therefore, it is expectable to prepare internally fluidizable catalyst particles using hollow spheres of aluminum oxide as carriers. In literature *Chem Phys. Lett.* 2019, 731, 1-6, hollow spheres of aluminum oxide were prepared using carbon microspheres as templates which were synthesized from glucose using a hydrothermal process. Hollow spheres of $\gamma$-$Al_2O_3$ prepared using this method have a diameter of 600 nm, a shell thickness of 80 nm, and a specific surface area of 186 $m^2/g$. In literature *Appl Catal. B: Environ.,* 2017, 211, 176-187, a transient aerosol-assisted self-assembly method was used to synthesize mesoporous hollow spheres of $Co_3O_4$—$Al_2O_3$, which turned to be thermally stable, with a diameter of 600 nm, a wall thickness of 100 nm, and a specific surface area of 95 $m^2/g$. At present, there are reports on the method for preparing hollow spheres of aluminum oxide, but the particle size is limited to micrometer and nanometer levels, and there are few reports on research of millimeter-level aluminum oxide carriers of a hollow structure and corresponding catalysts. In addition, size of the catalyst filled in the fixed bed used in industry needs to reach a millimeter level, so that it is of great significance to develop an internally fluidized fixed-bed catalyst of a millimeter level.

In the present invention, an emulsion is dropwise added to an oil phase using a dual-dropper apparatus of a coaxial structure to prepare a hollow spherical catalyst of an internal hollow structure and filled with precious metal nanopowder.

SUMMARY OF THE INVENTION

An object of the present invention is to provide a hollow spherical catalyst for a fixed bed with internal fluidization of particles and a method for preparing the same. The catalyst can realize complementary advantages of a catalyst for an existing fixed bed and a catalyst for a fluidized bed, and reduce losses of active components of a precious metal.

The catalyst provided in the present invention is expressed as $X@Al_2O_3$, where X represents precious metal nanopowder, and is one of Pd, Pt, Au, or Ag; $Al_2O_3$ is a hollow spherical particle; the catalyst has an outer diameter of 1.5-5.0 mm, a shell thicknesses of 0.5-3.0 mm, a shell pore diameter of 10-50 nm, and a crushing strength of 15-40 N; and X is wrapped inside $Al_2O_3$, has a size of 200-500 nm, and has a mass fraction of 0.05-10% in the whole spherical catalyst. Preferred dimensions and performance indicators of the catalyst include: an outer diameter of 2.5-4.1 mm, a shell thickness of 0.6-2 mm, a shell pore diameter of 10-50 nm, a crushing strength of 20-30 N, and a mass fraction of 1-5.0% of X in the spherical catalyst.

A technical scheme adopted in the present invention includes: fully mixing precious metal nanopowder and an organic oil phase to form an internal oil phase suspension, preparing a gel ball of an oil-in-water structure by taking an aluminum oxide molding solution as an outer aqueous phase using a coaxial dual-dropper forming apparatus, and then obtaining a hollow spherical aluminum oxide catalyst containing the precious metal nanopowder through aging, calcination, and reduction processes. The catalyst prepared using this method has favorable crushing strength and large pore diameter structure, thereby ensuring smooth diffusion of reactants and product molecules and full contact with the active components of the precious metal.

The present invention further provides a coaxial dual-dropper forming apparatus, as shown in FIG. 1, comprising two material tanks, two delivery pumps, a coaxial dropper, a hot oil column, and an aging reactor, where the coaxial dropper comprises an inner tube and an outer tube with different diameters. A connection mode of the apparatus is as follows: one of the material tanks is connected to an inlet end of the inner tube of the coaxial dropper through one of the delivery pumps, and the other material tank is connected to an inlet end of the outer tube of the coaxial dropper through the other delivery pump; the hot oil column is located under the coaxial dropper, with an outlet connected to a feed inlet of the aging reactor located under the hot oil column.

Diameters of the inner tube and the outer tube are determined according to a size of the catalyst to be prepared, generally, 0.3-2.5 mm for an inner diameter of the inner tube, and 0.9-5.0 mm for an inner diameter of the outer tube; and an outlet end of the inner tube protrudes 0.3-0.8 mm from an outlet end of the outer tube. The hot oil column is provided with a heating jacket, and the aging reactor is provided with a heating apparatus.

The method for preparing a hollow spherical catalyst for a fixed bed with internal fluidization of particles provided in the present invention includes the following specific steps:

A. Preparation of an Aluminum Oxide Molding Solution

Fully mixing an aluminum sol and a hexamethylenetetramine aqueous solution at a mass ratio of 2.0-6.0:1 in an ice water bath to prepare the aluminum oxide molding solution.

Preparing the aluminum sol: weighing aluminum powder with a purity greater than 99.6%, dissolving the aluminum powder in dilute hydrochloric acid at a concentration of 5-20% or an aluminum chloride crystal solution at a concentration of 10-25% at 95-105° C. to obtain the transparent and stable aluminum sol, where an aluminum content is 6-20%, preferably 10-15%; and an Al/Cl mass ratio is 0.3-3.0, preferably 1-2.

Preparing the hexamethylenetetramine solution: adding hexamethylenetetramine into deionized water to prepare the hexamethylenetetramine aqueous solution at a concentration of and then adding a viscosity regulator therein to obtain the hexamethylenetetramine solution.

The viscosity regulator is 10-30% acrylamide and/or hydroxymethylacrylamide, and the amount added is 1-10% of the mass of the hexamethylenetetramine aqueous solution.

B. Preparing an Internal Oil Phase Suspension

Fully dispersing powder of a precious metal X in an oily substance at a mass fraction of X of to obtain a suspension, i.e., the internal oil phase suspension; where the powder of the precious metal X is one of Pd, Pt, Au, or Ag nanopowder with a size of 200-500 nm.

The oily substance is a substance with a viscosity of 1.5-17.5 mm$^2$/s at 40° C., and is one of liquid paraffin, white oil No. 2, white oil No. 3, or white oil No. 7.

C. Preparing an Oil-in-water Alumina Gel Ball

Preparing the oil-in-water alumina gel ball using a coaxial dual-dropper forming apparatus, including steps of: loading the internal oil phase suspension into a material tank 1, and pumping the suspension into an inner tube 6 of a coaxial dropper through a delivery pump at a flow rate of 6-20 mL/h; at the same time, loading the aluminum oxide molding solution into a material tank 2, and pumping the solution into an outer tube 7 of the coaxial dropper through a delivery pump at a flow rate of 8-25 mL/h, with the flow rate in the outer tube 2-5 mL/h faster than that in the inner tube; forming an oil-in-water sol ball at an outlet of the dropper; dropwise adding the sol ball into a hot oil column at 70-95° C., then loading to the aging reactor in which a forming oil at 70-95° C. is filled; heating the forming oil to 130-160° C. for aging for 4-6 h; cooling to room temperature, taking out the mixture, washing drying the mixture, and obtaining the oil-in-water alumina gel ball with a diameter of 1.5-5.0 mm.

The forming oil has a viscosity of 12.5-39.5 mm$^2$/s at 40° C., and is one of vacuum pump oil, dimethicone, or white oil No. 15. A mass fraction of the precious metal X in each catalyst particle is controlled by regulating feed liquid flow rates in the outer tube and the inner tube of the dropper.

D. Preparing an X@Al$_2$O$_3$ Catalyst

Heating the dried alumina gel ball in a muffle furnace to 400-500° C. at a heating rate of 1-5° C./min, and keeping the gel ball at the temperature for 2-4 h, to remove oily substances in the internal oil phase suspension; then heating the mixture to 550-1,000° C. at a heating rate of 5-10° C./min for calcination for 2-4 h, to obtain different crystal forms of aluminum oxide; naturally cooling the aluminum oxide to room temperature, transferring the aluminum oxide to an atmosphere furnace, and heating the aluminum oxide in a reduction atmosphere to 200-450° C. at a heating rate of 2-10° C./min for reduction for 1-4 h, to obtain the target catalyst X@Al$_2$O$_3$.

The reduction atmosphere is one of 5-40% H$_2$/N$_2$ or 5-40% CO/N$_2$, and is at a flow rate of mL/min. The reduction process is intended to reduce the precious metal nanopowder oxidized in the air calcination process to a metallic state.

The resulting samples are characterized by:

FIG. 2 is a picture (a), a particle size diagram (b), and a cross-section view picture (c) of a millimeter-level spherical catalyst carrier prepared in Example 1. As can be seen from the figure, the resulting aluminum oxide particles have a homogeneous size, an average particle size of 2.6 mm, and a shell thickness of 0.85 mm.

FIG. 3 is a low-temperature nitrogen adsorption/desorption curve and a pore size distribution diagram of Pd@Al$_2$O$_3$ prepared in Example 1. FIG. a is the low-temperature nitrogen adsorption/desorption curve, which is of type IV, indicating that the catalyst has a favorable mesoporous structure. FIG. b is the pore size distribution diagram, indicating that the catalyst has a pore size of 2-48 nm, and an average pore size of 11.9 nm.

FIG. 4 is a picture (a), a particle size diagram (b), and a cross-section view picture (c) of a millimeter-level spherical catalyst carrier prepared in Example 2. As can be seen from the figure, the resulting aluminum oxide particles have a homogeneous size, an average particle size of 2.6 mm, and a shell thickness of 0.75 mm.

FIG. 5 is a low-temperature nitrogen adsorption/desorption curve and a pore size distribution diagram of Pt@Al$_2$O$_3$ prepared in Example 2. FIG. a is the low-temperature nitrogen adsorption/desorption curve, which is of type IV, indicating that the catalyst has a favorable mesoporous structure. FIG. b is the pore size distribution diagram, indicating that the catalyst has a pore size of 2-48 nm, and an average pore size of 14.5 nm.

The present invention has the beneficial effects that: in the present invention, by taking the advantage of insolubility of oil phase and aqueous phase, a gel ball of an oil-in-water structure is prepared using an independently developed coaxial dual-dropper forming apparatus, and then through the processes of aging, calcination, and reduction to the gel balls, a hollow aluminum oxide catalyst containing precious metal powder is prepared. Thanks to the fluidity of the precious metal nanopowder contained inside and the large pore diameter on shell, the catalyst, when used in a fixed bed, can ensure that the reactant and product molecules diffuse into and out of the catalyst smoothly and fully contact with precious metal components, forming a micro-fluidization reaction system, thus effectively combining advantages of a fixed-bed catalyst and a fluidized-bed catalyst. Such a catalyst has never been reported yet.

5

Figure 1:
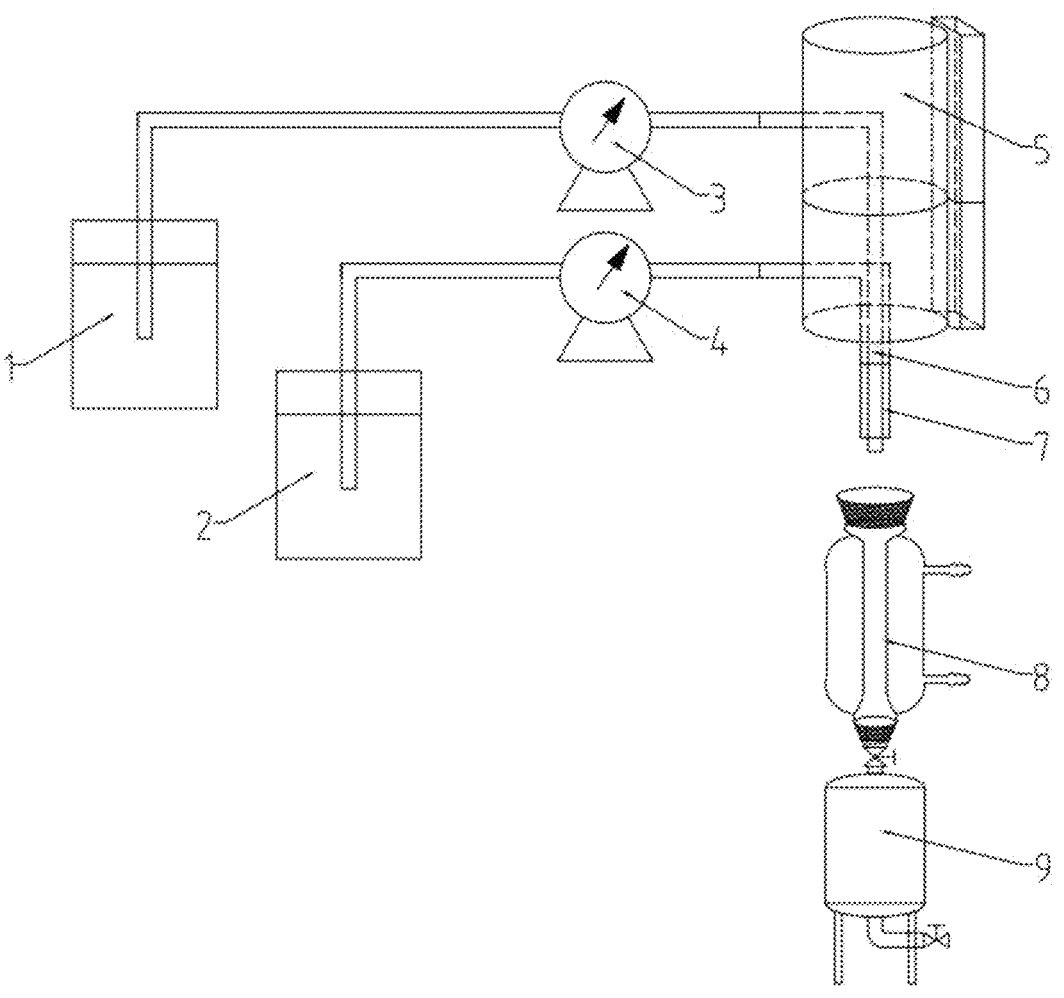
FIG. 1 is a diagram of a forming apparatus for making a gel ball of a water-oil structure, where (1) and (2) are material tanks, (3) and (4) are delivery pumps, (5) is a coaxial dropper, (6) is an inner tube of the coaxial dropper, (7) is an outer tube of the coaxial dropper, (8) is a hot oil column, and (9) is an aging reactor.
Figure 2:
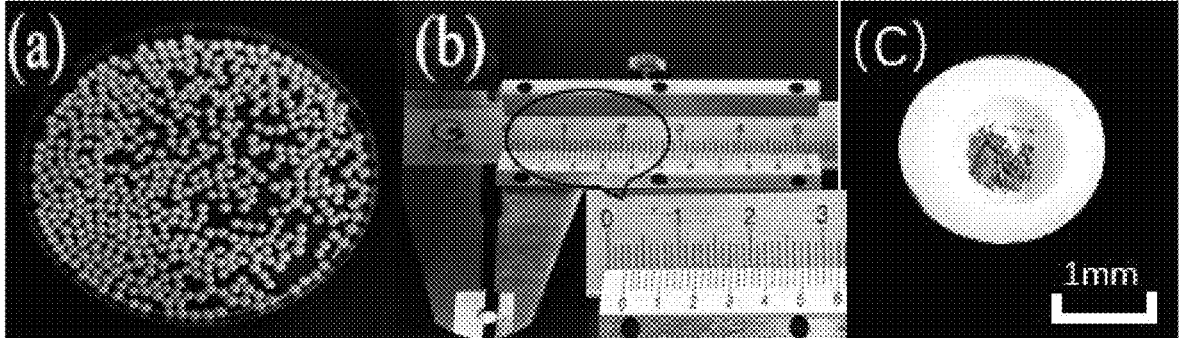

FIG. 2 is a picture (a), a particle size picture (b), and a cross-section view (c) of a millimeter-level spherical catalyst prepared in Example 1.

Figure 3:
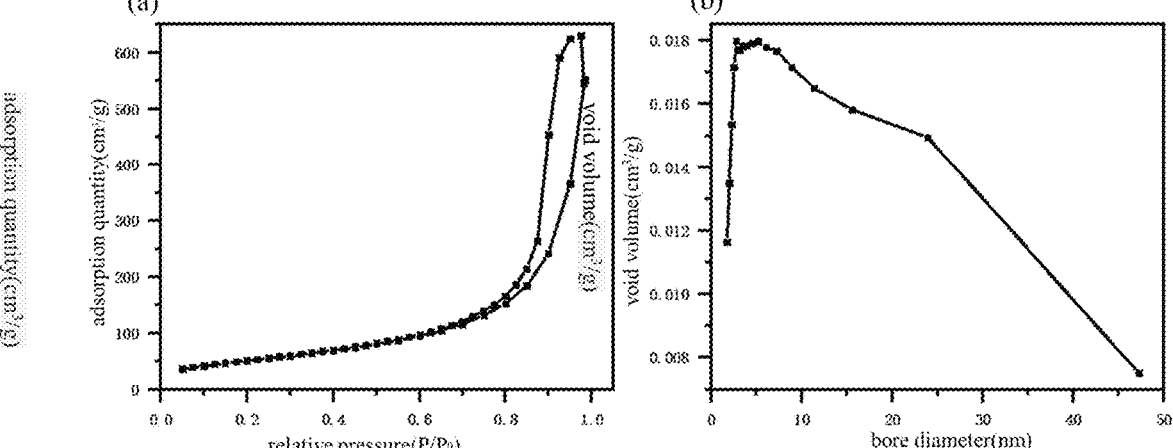

FIG. 3 is a low-temperature nitrogen adsorption/desorption curve (a) and a pore size distribution diagram (b) of the catalyst obtained in Example 1.

Figure 4:
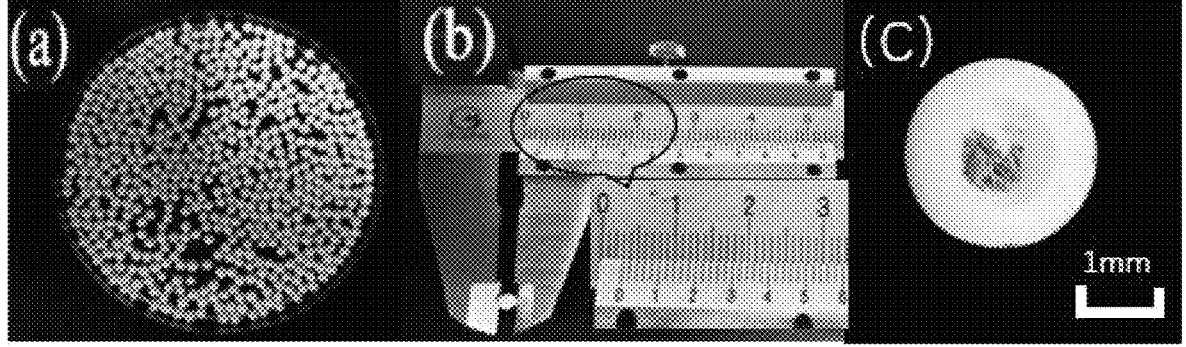

FIG. 4 is a picture (a), a particle size picture (b), and a cross-section view (c) of a millimeter-level spherical catalyst prepared in Example 2.

Figure 5:
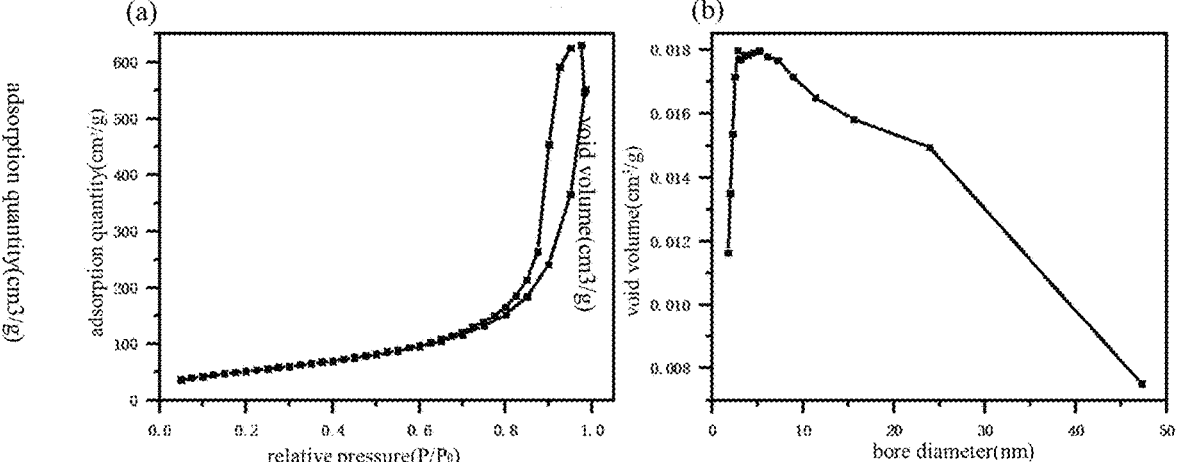

FIG. 5 is a low-temperature nitrogen adsorption/desorption curve (a) and a pore size distribution diagram (b) of the catalyst obtained in Example 2.

DETAILED DESCRIPTION

Example 1

Target catalyst: Pd@Al$_2$O$_3$ with an average particle diameter of 2.6 mm, a shell thickness of 0.85 mm, and a Pd (active component) loading of 2.0%.

Preparation of an Aluminum Oxide Molding Solution

The aluminum oxide molding solution was formed by mixing an aluminum sol with an aluminum content of 17% and a 40% hexamethylenetetramine solution. The aluminum sol and the hexamethylenetetramine solution were prepared as follows:

25 g of aluminum powder with a purity of 99.8% was weighed, and added into 120 g of dilute hydrochloric acid at a concentration of 10%. The aluminum powder was dissolved at 102° C. to obtain the transparent and stable aluminum sol. The aluminum sol has an aluminum content of 17%, and an Al/Cl mass ratio of 2.1.

49.5 g of the aluminum sol prepared in the above steps was weighed, and placed in an ice water bath. 6.2 g of hexamethylenetetramine was added into another beaker, and 9.3 g of deionized water was added to form the hexamethylenetetramine solution at a concentration of 40%. Then, 1.0 g of an acrylamide solution was added, and the mixture was stirred until the mixture was transparent and stable. In an ice water bath, the two solutions were fully mixed and fully stirred.

B. Preparation of a Pd-containing Oil Phase Suspension 40 g of liquid paraffin was mixed with 0.3 g of Pd powder to obtain the internal oil phase suspension with an average particle size of Pd powder of 200 nm.

C. Preparation of an Oil-in-water Gel Ball

The internal oil phase suspension was transferred to a material tank 1, the aluminum oxide molding solution was transferred to a material tank 2, a delivery pump was switched on, and the material liquid in the material tank 1 was pumped into an inner tube 6 through a delivery pump 3 at a flow rate of 7 mL/h. Simultaneously, the material liquid in the material tank 2 was pumped into an outer tube 7 of a dropper through a delivery pump 4 at a flow rate of 10 mL/h. The two liquids dropped out from a coaxial dropper to form an oil-in-water emulsion droplet, which fell into a hot oil column at 88° C., and then dropped into dimethicone present in an aging reactor through the hot oil column to form a gel ball of a water-oil structure. There was dimethicone at 88°

6

C. in the aging reactor. Dimethicone was heated to 150° C. for aging for 4 h, cooled to room temperature, taken out, washed, and dried, to obtain a water-oil alumina gel ball with a diameter of 2.6 mm.

An inner tube of the coaxial dropper has a diameter of 0.5 mm, an outer tube of the coaxial dropper has a diameter of 1.5 mm, and the inner tube protrudes 0.5 mm from the outer tube.

D. Preparation of a Pd@Al$_2$O$_3$ Catalyst

The dried alumina gel ball was heated in a muffle furnace to 400° C. at a heating rate of 2° C./min, kept at this temperature for 2 h, then heated to 960° C. at a heating rate of 6° C./min, kept at this temperature for 3 h, and then naturally cooled to room temperature.

The resulting spherical aluminum oxide was transferred to an atmosphere furnace, and heated to 350° C. in the presence of 10% H$_2$/N$_2$ reducing gas at a gas flow rate of 50 mL/min at a heating rate of 2° C./min for reduction for 2 h, to obtain the Pd@Al$_2$O$_3$ catalyst. The performance test results are shown in Table 1.

Example 2

Target catalyst: Pt@Al$_2$O$_3$ with an average particle diameter of 2.6 mm, a shell thickness of 0.75 mm, and a Pt (active component) loading of 2.0%.

A. Preparation of an Aluminum Oxide Molding Solution

The aluminum oxide molding solution was formed by mixing an aluminum sol with an aluminum content of 17% and a 40% hexamethylenetetramine solution. The aluminum sol and the hexamethylenetetramine solution were prepared as follows:

25 g of aluminum powder with a purity of 99.7% was weighed, and added into 120 g of an aluminum chloride crystal solution at a concentration of 10%. The aluminum powder was dissolved at 102° C. to obtain the transparent and stable aluminum sol. The aluminum sol has an aluminum content of 17%, and an Al/Cl mass ratio of 2.1.

62.3 g of the aluminum sol prepared in the above step A was weighed, and placed in an ice water bath. 7.8 g of hexamethylenetetramine was added into another beaker, and 11.7 g of deionized water was added to form the hexamethylenetetramine solution at a concentration of 40%. Then, 0.8 g of a hydroxymethyl acrylamide solution was added, and the mixture was fully stirred until the mixture was transparent and stable. In an ice water bath, the two solutions were fully mixed and fully stirred.

B. Preparation of a Pt-containing Oil Phase Suspension 45 g of liquid paraffin was mixed with 0.4 g of Pt powder to obtain the internal oil phase suspension with an average particle size of Pt powder of 250 nm.

C. Preparation of an Oil-in-water Gel Ball

The preparation processes are the same as those in Example 1, where an inner tube of a dropper has a diameter 0.6 mm, an outer tube of the dropper has a diameter of 1.5 mm, and the inner tube protrudes 0.6 mm from the outer tube; a flow rate of the aluminum oxide molding solution is 12 mL/h, and a flow rate of the internal oil phase suspension is 8 mL/h; a falling oil-in-water emulsion droplet fell into a hot oil column at 90° C., and then dropped into dimethicone present in an aging reactor through the hot oil column to form a gel ball of a water-oil structure. There was dimethicone at 90° C. in the aging reactor. Dimethicone was heated to 155° C. for aging for 4 h, cooled to room temperature, taken out, washed, and dried, to obtain a water-oil alumina gel ball with a diameter of 2.6 mm.

D. Preparation of a Pt@Al$_2$O$_3$ Catalyst

The dried alumina gel ball was heated in a muffle furnace to 400° C. at a heating rate of 2° C./min, kept at this temperature for 2.5 h, then heated to 960° C. at a heating rate of 6° C./min, kept at this temperature for 3 h, and then naturally cooled to room temperature.

The resulting spherical aluminum oxide was transferred to an atmosphere furnace, and heated to 400° C. in the presence of 15% H$_2$/N$_2$ reducing gas at a gas flow rate of 50 mL/min at a heating rate of 2° C./min for reduction for 2 h, to obtain the Pt@Al$_2$O$_3$ catalyst. The performance test results are shown in Table 1.

Example 3

Target catalyst: Ru@Al$_2$O$_3$ with an average particle diameter of 3.1 mm, a shell thickness of 1.0 mm, and a Ru (active component) loading of 4.0%.

A. Preparation of an Aluminum Oxide Molding Solution

The aluminum oxide molding solution was formed by mixing an aluminum sol with an aluminum content of 12% and a 40% hexamethylenetetramine solution. The aluminum sol and the hexamethylenetetramine solution were prepared as follows:

17 g of aluminum powder with a purity of 99.8% was weighed, and added into 120 g of dilute hydrochloric acid at a concentration of 10%. The aluminum powder was dissolved at 102° C. to obtain the transparent and stable aluminum sol. The aluminum sol has an aluminum content of 12%, and an Al/Cl mass ratio of 1.4.

75 g of the aluminum sol prepared in the above step A was weighed, and placed in an ice water bath. 9.4 g of hexamethylenetetramine was added into another beaker, and 14.1 g of deionized water was added to form the hexamethylenetetramine solution at a concentration of 40%. Then, 1.1 g of a hydroxymethyl acrylamide solution was added, and the mixture was fully stirred until the mixture was transparent and stable. In an ice water bath, the two solutions were fully mixed and fully stirred.

B. Preparation of a Ru-containing Internal Oil Phase Suspension 40 g of liquid paraffin was mixed with 0.7 g of Ru powder to obtain the internal oil phase suspension with an average particle size of Ru powder of 320 nm.

C. Preparation of an Oil-in-water Gel Ball

The preparation processes are the same as those in Example 1, where an inner tube of a dropper has a diameter 0.6 mm, an outer tube of the dropper has a diameter of 2.5 mm, and the inner tube protrudes 0.5 mm from the outer tube; a flow rate of the aluminum oxide molding solution is 15 mL/h, and a flow rate of the internal oil phase suspension is 11 mL/h; a falling oil-in-water emulsion droplet fell into a hot oil column at 94° C., and then dropped into dimethicone present in an aging reactor through the hot oil column to form a gel ball of a water-oil structure. There was dimethicone at 94° C. in the aging reactor. Dimethicone was heated to 150° C. for aging for 4.5 h, cooled to room temperature, taken out, washed, and dried, to obtain a water-oil alumina gel ball with a diameter of 3.1 mm.

D. Preparation of Ru @Al$_2$O$_3$ Catalyst

The dried alumina gel ball was heated in a muffle furnace to 400° C. at a heating rate of 3° C./min, kept at this temperature for 2 h, then heated to 800° C. at a heating rate of 8° C./min, kept at this temperature for 3 h, and then naturally cooled to room temperature.

The resulting spherical aluminum oxide was placed in an atmosphere furnace, and heated to 400° C. in the presence of 7% H$_2$/N$_2$ reducing gas at a gas flow rate of 50 mL/min at a heating rate of 4° C./min for reduction for 2 h, to obtain the Ru@Al$_2$O$_3$ catalyst. The performance test results are shown in Table 1.

Example 4

Target catalyst: Ag@Al$_2$O$_3$ with an average particle diameter of 3.1 mm, a shell thickness of 0.9 mm, and an Ag (active component) loading of 3.9%.

A. Preparation of an Aluminum Oxide Molding Solution

The aluminum oxide molding solution was formed by mixing an aluminum sol with an aluminum content of 14% and a 40% hexamethylenetetramine solution. The aluminum sol and the hexamethylenetetramine solution were prepared as follows:

20 g of aluminum powder with a purity of 99.7% was weighed, and added into 120 g of dilute hydrochloric acid at a concentration of 10%. The aluminum powder was dissolved at 102° C. to obtain the transparent and stable aluminum sol. The aluminum sol has an aluminum content of 14%, and an Al/Cl mass ratio of 1.7.

87 g of the aluminum sol prepared in the above step A was weighed, and placed in an ice water bath. 10.9 g of hexamethylenetetramine was added into another beaker, and 16.4 g of deionized water was added to form the hexamethylenetetramine solution at a concentration of 40%. Then, 1.0 g of a hydroxymethyl acrylamide solution was added, and the mixture was fully stirred until the mixture was transparent and stable. In an ice water bath, the two solutions were fully mixed and fully stirred.

B. Preparation of an Ag-containing Internal Oil Phase Suspension 40 g of liquid paraffin was mixed with 0.9 g of Ag powder to obtain the internal oil phase suspension with an average particle size of Ag powder of 360 nm.

C. Preparation of an Oil-in-water Gel Ball

The preparation processes are the same as those in Example 1, where an inner tube of a dropper has a diameter 0.8 mm, an outer tube of the dropper has a diameter of 2.5 mm, and the inner tube protrudes 0.6 mm from the outer tube; a flow rate of the aluminum oxide molding solution is 14 mL/h, and a flow rate of the internal oil phase suspension is 11 mL/h; a falling oil-in-water emulsion droplet dropped into a hot oil column at 92° C., and then dropped into dimethicone present in an aging reactor through the hot oil column to form a gel ball of a water-oil structure. There was dimethicone at 92° C. in the aging reactor. Dimethicone was heated to 155° C. for aging for 5 h, cooled to room temperature, taken out, washed, and dried, to obtain a water-oil alumina gel ball with a diameter of 3.1 mm.

D. Preparation of an Ag@Al$_2$O$_3$ Catalyst

The dried alumina gel ball was heated in a muffle furnace to 500° C. at a heating rate of 3° C./min, kept at this temperature for 3 h, then heated to 900° C. at a heating rate of 7° C./min, kept at this temperature for 3 h, and then naturally cooled to room temperature.

The resulting spherical aluminum oxide was placed in an atmosphere furnace, and heated to 350° C. in the presence of 20% H$_2$/N$_2$ reducing gas at a flow rate of 50 mL/min at a heating rate of 3° C./min for reduction for 3 h, to obtain the Ag@Al$_2$O$_3$ catalyst. The performance test results are shown in Table 1.

Example 5

Target catalyst: Pt@Al$_2$O$_3$ with an average particle diameter of 4.1 mm, a shell thickness of 1.4 mm, and a Pt (active component) loading of 2.5%.

A. Preparation of an Aluminum Oxide Molding Solution

The aluminum oxide molding solution was formed by mixing an aluminum sol with an aluminum content of 17% and a 40% hexamethylenetetramine solution. The aluminum sol and the hexamethylenetetramine solution were prepared as follows:

25 g of aluminum powder with a purity of 99.7% was weighed, and added into 120 g of an aluminum chloride crystal solution at a concentration of 10%. The aluminum powder was dissolved at 102° C. to obtain the transparent and stable aluminum sol. The aluminum sol has an aluminum content of 17%, and an Al/Cl mass ratio of 2.1.

62.3 g of the aluminum sol prepared in the above step A was weighed, and placed in an ice water bath. 7.8 g of hexamethylenetetramine was added into another beaker, and 11.7 g of deionized water was added to form the hexamethylenetetramine solution at a concentration of 40%. Then, 1.1 g of an acrylamide solution was added, and the mixture was fully stirred until the mixture was transparent and stable. In an ice water bath, the two solutions were fully mixed and fully stirred.

B. Preparation of a Pt-containing Oil Phase Suspension 40 g of liquid paraffin was mixed with 0.5 g of Pt powder to obtain the internal oil phase suspension with an average particle size of Pt powder of 400 nm.

C. Preparation of an Oil-in-water Gel Ball

The preparation processes are the same as those in Example 1, where an inner tube of a dropper has a diameter 0.8 mm, an outer tube of the dropper has a diameter of 3.5 mm, and the inner tube protrudes 0.5 mm from the outer tube; a flow rate of the aluminum oxide molding solution is 14 mL/h, and a flow rate of the internal oil phase suspension is 10 mL/h; a falling oil-in-water emulsion droplet dropped into a hot oil column at 94° C., and then dropped into dimethicone present in an aging reactor through the hot oil column to form a gel ball of a water-oil structure. There was dimethicone at 94° C. in the aging reactor. Dimethicone was heated to 150° C. for aging for 4 h, cooled to room temperature, taken out, washed, and dried, to obtain a water-oil alumina gel ball with a diameter of 4.1 mm.

D. Preparation of a Pt@Al$_2$O$_3$ Catalyst

The dried alumina gel ball was heated in a muffle furnace to 500° C. at a heating rate of 4° C./min, kept at this temperature for 2 h, then heated to 960° C. at a heating rate of 8° C./min, kept at this temperature for 3 h, and then naturally cooled to room temperature.

The resulting spherical aluminum oxide was transferred to an atmosphere furnace, and heated to 450° C. in the presence of 10% H$_2$N$_2$ reducing gas at a flow rate of 50 mL/min at a heating rate of 4° C./min for reduction for 2 h, to obtain the Pt@Al$_2$O$_3$ catalyst. The performance test results are shown in Table 1.

TABLE 1

| | Example 1 | Example 2 | Example 3 | Example 4 | Example 5 |
|---|---|---|---|---|---|
| Outer diameter (mm) | 2.6 | 2.6 | 3.1 | 3.1 | 4.1 |
| Shell thickness (mm) | 0.8 | 0.7 | 1.0 | 0.9 | 1.4 |
| Catalyst content | 2.0% | 2.0% | 4.0% | 3.9% | 2.5% |
| Bulk density (g/m$^3$) | 0.37 | 0.34 | 0.32 | 0.27 | 0.25 |
| Crushing strength (N) | 26 | 23 | 28 | 26 | 30 |

The invention claimed is:

1. A method for preparing a hollow spherical catalyst for a fixed bed with internal fluidization of particles, comprising:

A. preparing an aluminum oxide molding solution
fully mixing an aluminum sol and a hexamethylenetramine aqueous solution at a mass ratio of 2.0-6.0:1 in an ice water bath to get aluminum oxide molding solution;
preparing the aluminum sol: weighing aluminum powder with a purity greater than 99.6%, dissolving the aluminum powder in dilute hydrochloric acid at a concentration of 5-20% or an aluminum chloride crystal solution at a concentration of 10-25% at 95-105° C. to obtain the transparent and stable aluminum sol, wherein the aluminum content is 6-20%, and the Al/Cl mass ratio is 0.3-3.0; and
preparing the hexamethylenetetramine solution: adding hexamethylenetetramine into deionized water to prepare the hexamethylenetetramine aqueous solution at a concentration of 20-40%, and then adding a viscosity regulator therein to obtain the hexamethylenetetramine solution;

wherein the viscosity regulator is 10-30% acrylamide and/or hydroxymethylacrylamide, and the amount added is 1-10% of a mass of the hexamethylenetetramine aqueous solution;

B. preparing an internal oil phase suspension fully dispersing powder of precious metal X in an oily substance at a mass fraction of 0.1-5.0% to obtain a suspension, i.e., the internal oil phase suspension; wherein the powder of the precious metal X is one of Pd, Pt, Au, or Ag nanopowder with a size of 200-500 nm; and the oily substance is one of liquid paraffin, white oil No. 2, white oil No. 3, or white oil No. 7;

C. preparing oil-in-water alumina gel balls preparation using a coaxial dual-dropper forming apparatus comprising steps of: transferring the aluminum oxide molding solution in a material tank 2, switching on the delivery pump; adding the internal oil phase suspension into the material tank for pumping into an inner tube 6 of the coaxial dropper through the delivery pump at a flow rate of 6-20 mL/h; simultaneously loading the aluminum oxide molding solution into another material tank for pumping into an outer tube of the coaxial dropper through another delivery pump at a flow rate of 8-25 mL/h, and controlling the flow rate in the outer tube to be 2-5 mL/h faster than that in the inner tube; oil-in-water sol balls will be formed at the outlet of the dropper; dropwise adding the sol balls into a hot oil column at 70-95° C., then adding the sol balls into forming oil at 70-95° C. present in an aging reactor, heating the forming oil to 130-160° C. for aging for 4-6 h, cooling the mixture to room temperature, taking out the mixture, washing and drying. In this way, oil-in-water alumina gel balls with a diameter of 1.5-5.0 mm can be obtained;

wherein the forming oil is one of vacuum pump oil, dimethicone, or white oil No. 15; and a mass fraction of the precious metal X in each catalyst particle is controlled by regulating the feed liquid flow rates in the outer tube and the inner tube; and D. preparing an $X@\,Al_2O_3$ catalyst heating dry alumina gel balls in a muffle furnace to 400-500° C. at a rate of 1-5° C./min, and keeping the gel balls at the temperature for 2-4 h, to remove oily substances in the internal oil phase suspension; then heating the mixture to 550-1,000° C. at a rate of 5-10° C./min for calcination for 2-4 h, to obtain different crystal forms of aluminum oxide; air cooling the aluminum oxide to room temperature, transferring the aluminum oxide to an atmosphere furnace, and heating the aluminum oxide in a reduction atmosphere to 200-450° C. at a rate of 2-10° C./min for reduction for 1-4 h, to obtain the $X@Al_2O_3$ catalyst;

wherein the reduction atmosphere is one of 5-40% $H_2/N_2$ or 5-40% $CO/N_2$ at a gas flow rate of 20-100 mL/min.

2. The method for preparing a hollow spherical catalyst for a fixed bed with internal fluidization of particles according to claim 1, wherein in the aluminum sol in step A, the aluminum content is 10-15%, and the Al/Cl mass ratio is 1-2.

3. The method for preparing a hollow spherical catalyst for a fixed bed with internal fluidization of particles according to claim 1, wherein the catalyst is expressed as $X@Al_2O_3$; X represents precious metal nanopowder, and is one of Pd, Pt, Au, or Ag; $Al_2O_3$ is a hollow spherical particle; the catalyst has an outer diameter of 1.5-5.0 mm, a shell thicknesses of 0.5-3.0 mm, a shell pore diameter (aluminum oxide) of 10-50 nm, and a crushing strength of 15-40 N; and X is wrapped inside $Al_2O_3$, has a size of 200-500 nm, and has a mass fraction of 0.05-10% in the catalyst.

4. The method for preparing a hollow spherical catalyst for a fixed bed with internal fluidization of particles according to claim 3, wherein the catalyst has the outer diameter of 2.5-4.1 mm, the shell thickness of 0.6-2 mm, the shell pore diameter of 10-50 nm, and the crushing strength of 20-30 N, and the mass fraction of 1-5.0% of X in the spherical catalyst.

5. An apparatus for preparing the hollow spherical catalyst for a fixed bed with internal fluidization of particles according to claim 3, wherein the apparatus comprises two material tanks, two delivery pumps, a coaxial dropper, a hot oil column, and an aging reactor; wherein the coaxial dropper comprises an inner tube and an outer tube with different diameters; and a connection mode of the apparatus is as follows: one of the material tanks is connected to an inlet end of the inner tube of the coaxial dropper through one of the delivery pumps, and the other material tank is connected to an inlet end of the outer tube of the coaxial dropper through the other delivery pump, the hot oil column is located under the coaxial dropper, an outlet of the hot oil column is connected to a feed inlet of the aging reactor located under the hot oil column; and an inner diameter of the inner tube is 0.3-2.5 mm, an inner diameter of the outer tube is 0.9-5.0 mm, an outlet end of the inner tube protrudes 0.3-0.8 mm from an outlet end of the outer tube; the hot oil column is provided with a heating jacket, and is provided with a discharge valve at a lower end; and the aging reactor is a reactor with a heating apparatus.

* * * * *